May 24, 1960 — W. E. THORNTON — 2,938,201

SCORING SYSTEM

Filed Sept. 17, 1956 — 4 Sheets-Sheet 1

INVENTOR
William E. Thornton

May 24, 1960
W. E. THORNTON
2,938,201
SCORING SYSTEM
Filed Sept. 17, 1956
4 Sheets-Sheet 2
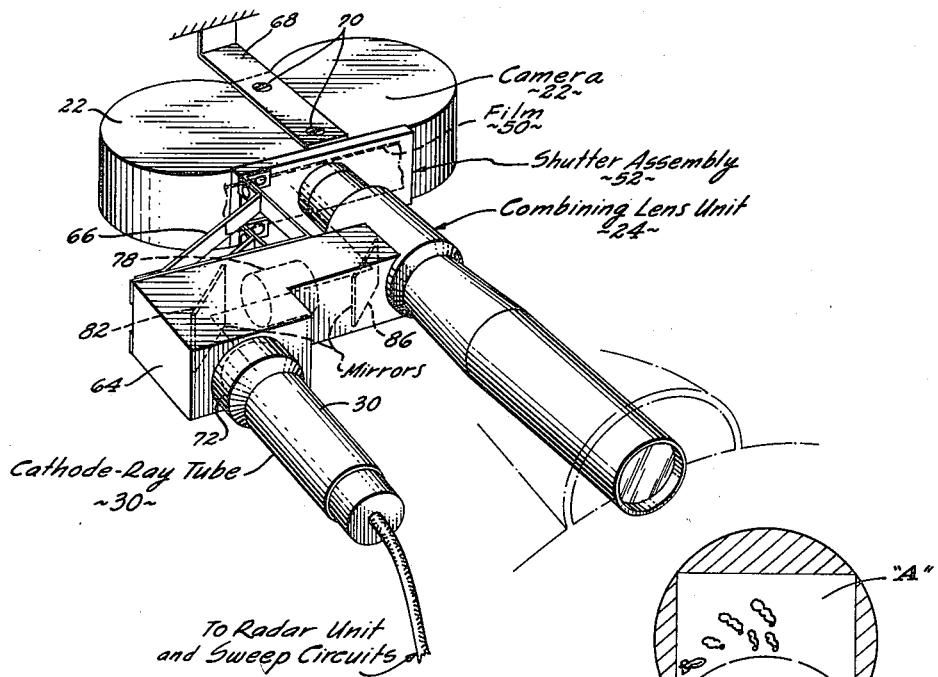
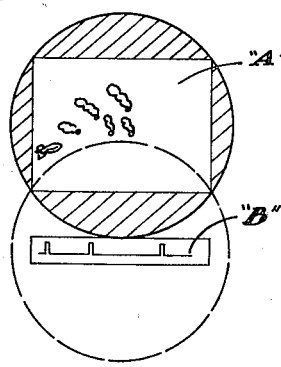
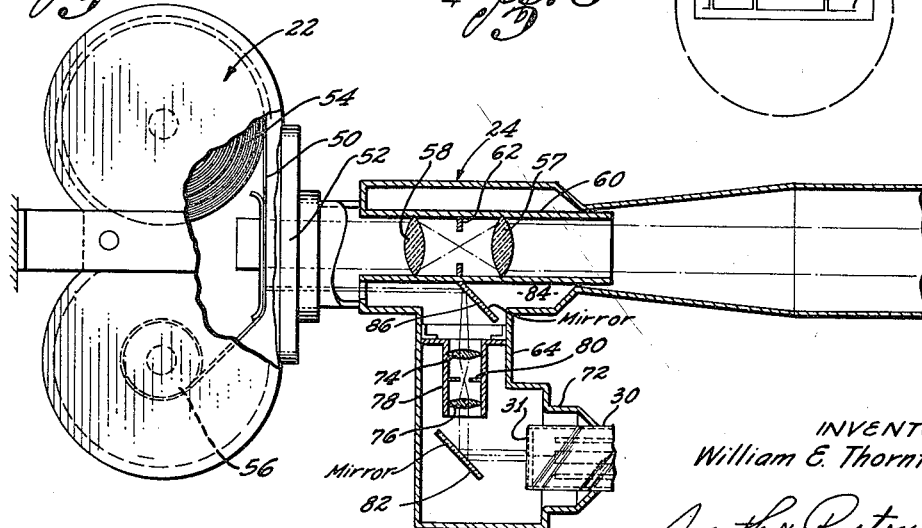
INVENTOR:
William E. Thornton
By Smyth & Roston
Attorneys May 24, 1960 W. E. THORNTON 2,938,201
SCORING SYSTEM
Filed Sept. 17, 1956 4 Sheets-Sheet 3
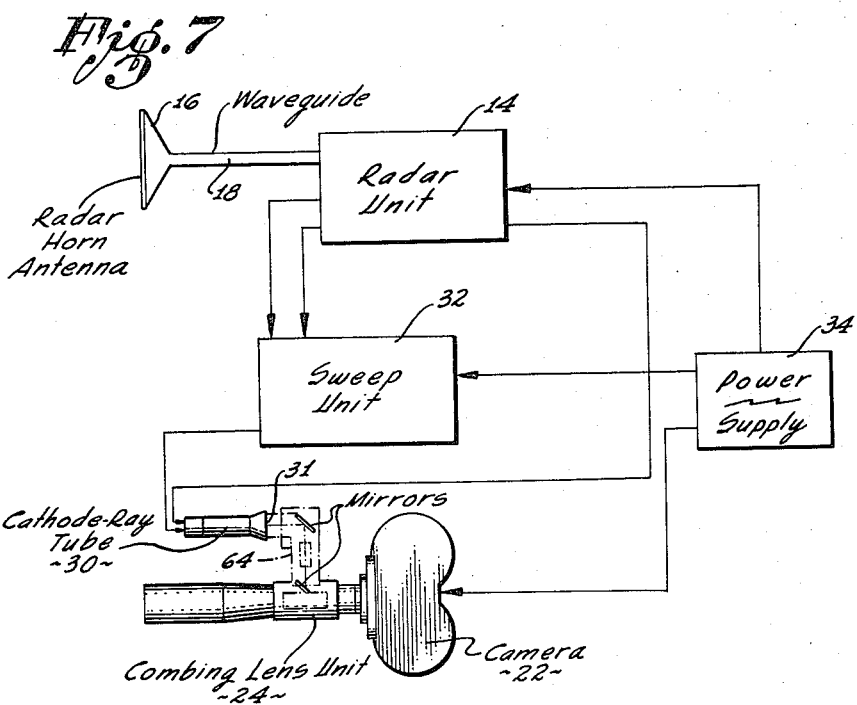
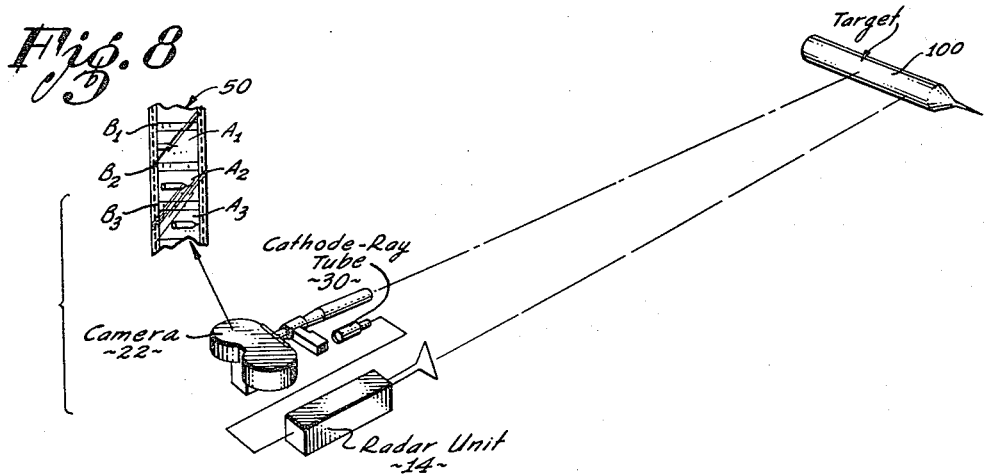
INVENTOR:
William E. Thornton May 24, 1960  W. E. THORNTON  2,938,201
SCORING SYSTEM
Filed Sept. 17, 1956  4 Sheets-Sheet 4

INVENTOR:
William E. Thornton
By Smyth & Roston
Attorneys

United States Patent Office 2,938,201
Patented May 24, 1960

2,938,201

SCORING SYSTEM n, Chapel Hill, N.C., assignor to Del
 Enginee aboratories, Los Angeles, Calif., a corporation Filed Sept. 17, 1956, Ser. No. 610,140

13 Claims. (Cl. 343—5)

The present invention relates in general to systems and apparatus for deriving data pertaining to the flight path of a projectile. The invention is more particularly concerned with an improved scoring system for measuring the miss distances between an airborne target and projectiles fired at the target.

It has been found that automatic fire control systems for use in aircraft and the like must, for optimum accuracy, undergo preliminary and adjustments in the field. These adjustments cannot feasibly be carried out from data obtained while th aircraft is on the ground. Rather, a pressing need has existed in the art for a reliable scoring system which will accurately record the miss-distances between th projectiles fired from an attacking aircraft and an airborne target. Such a scoring system is essential for providing data pertaining to the operation of the fire control system under actual attack conditions so as to permit accurate and precise adjustments to be made to the systems.

There is also a need for a reliable and simple scoring system for aerial target practice. This need is especially pressing in present day training programs in which an important part of the curriculum involves simulated rocket attacks by aircraft. In these attacks, rockets are fired by the attacking aircraft at targets towed by other aircraft. Many attempts have been made in the past to provide adequate and reliable scoring systems for this purpose. However, most of the prior art systems have involved the use of delicate equipment in the targets in conjunction with other sensitive and delicate equipment intended to be carried by the aircraft or to be situated at a ground station. For the most part, these prior art systems have been found to be unreliable in operation and difficult to maintain and service.

A reliable scoring system is also desirable in actual combat to determine the potentialities of different types of aircraft and their firing equipment. Such a scoring system is also useful in actual combat to determine the effectiveness of the rockets used. It is also valuable for providing a record of actual hits.

An object of the present invention is to provide a relatively inexpensive, reliable, accurate and rugged scoring system for use with aerial targets. The scoring system of the invention, moreover, is extremely simple to use and maintain. The system does not require instrumentation of any type at the target itself. It is merely necessary that the target be radar reflective and that it be "visible" to a recording camera. This enables simple and light targets to be used with correspondingly low cost and uncomplicated towing equipment.

A more general object of the invention is to provide an improved system and apparatus for tracking a projectile in flight and for furnishing complete data concerning the path of the projectile.

The invention combines radar and optical principles for assimilating the necessary information to determine the miss distances between an airborne target and projectiles fired at the target. A motion picture camera mounted, for example, in the attacking or firing aircraft, is directed at the target area. When the projectiles are fired, the camera is brought into operation. The camera, therefore, records a series of optical image frames on its film strip showing the target as it is moved by the towing aircraft and also showing the projectiles approaching and passing the target. However, because the camera is in effect "behind" the projectile, it is impossible to determine by the camera the point at which the projectiles actually cross the path of the target. That is, the camera does not provide the third dimensional information concerning the path of the projectiles. This latter information is provided by radar. Radar is used to indicate the distances between the attacking aircraft and the approaching target and receding projectiles. These radar-indicated distances are correlated with the optical image frames on the film strip in the camera. Then the frame, in which the distance to the target is radar-indicated as equal to the distance to the projectiles, is the one representing the target area at the time the projectiles are actually crossing the path of the target. This particular frame can then be used to measure the miss-distances between the projectiles and the target. These measurements can be made stadiametrically by comparing the distances from the target image to the projectile images with the image of the known length of the target. Alternately, the measurements can be made by providing fiducial range markings in a manner to be described.

Although the system of the invention is particularly suited for scoring the miss-distances between projectiles and airborne targets, it is susceptible to many other uses. For example, by utilizing such fiducial range markings, it may be used in ballistic studies for providing all the necessary information to plot the distance, velocity and acceleration curves of a projectile. It can also be used to provide accurate data of the dispersion characteristics of simultaneously fired rockets. In fact, the invention has general application to the field of rockets, projectiles, missiles and the like, for providing three-dimensional information concerning the flight paths traveled by such bodies.

The apparatus required in the system of the invention is composed of relatively few components, and it is relatively light and compact. As noted above, all the apparatus may be mounted in the firing or attacking aircraft. In accordance with one embodiment of the invention, the apparatus is housed in a tank conveniently carried from the bomb shackles of a conventional present day fighter type aircraft. In another embodiment of the invention, the apparatus is mounted in a housing or "blister" that may conveniently be affixed to the access panel, or other convenient portion, of the aircraft. Access panels are standard equipment in most modern fighter aircraft, and these panels are usually placed on the top of the aircraft forward of the cockpit.

Other features and advantages of the present invention will be hereinafter apparent from the following description, particularly when taken in connection with the accompanying drawings, in which Figure 1 shows a conventional jet fighter aircraft having an access panel positioned at its forward end between the cockpit and nose of the aircraft, this panel supporting a blister which, in turn, serves as mounting means for the apparatus of the invention;

Figure 4 is a perspective fragmentary view of a camera and cathode ray tube assembly together with an appropriate combining lens system, these components being utilized in the apparatus of the invention to provide a dual film record in a manner to be described;

Figure 5 is a detailed illustration of the camera of Figure 4, and of a combining lens which may be utilized with the camera to produce a composite film reproduction of properly correlated optical information;

Figure 6 is a schematic representation of the images projected by the combining lens of Figure 5 on the film strip of the camera;

Figure 7 is a block diagram of certain electrical components that may be used to constitute one embodiment of the invention, and this figure also shows schematically other equipment used in the apparatus and system of the invention;

Figure 8 is a schematic showing of a system forming one embodiment of the invention as used in conjunction with an airborne target, and this figure is useful in explaining the operation of the invention;

Particular reference will now be made to the drawings for a detailed explanation of the system and apparatus of the invention.

Figure 1:
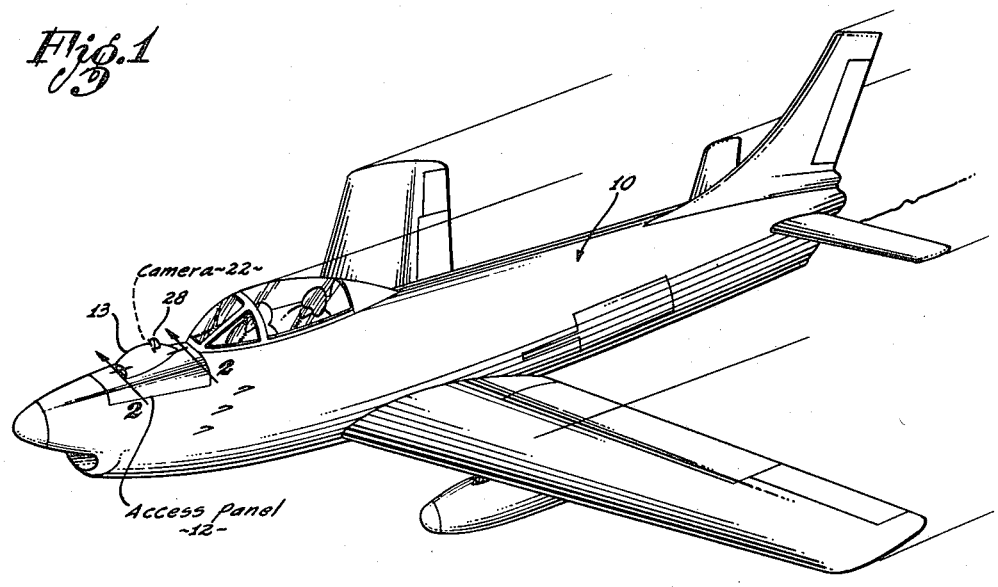
Figure 2:
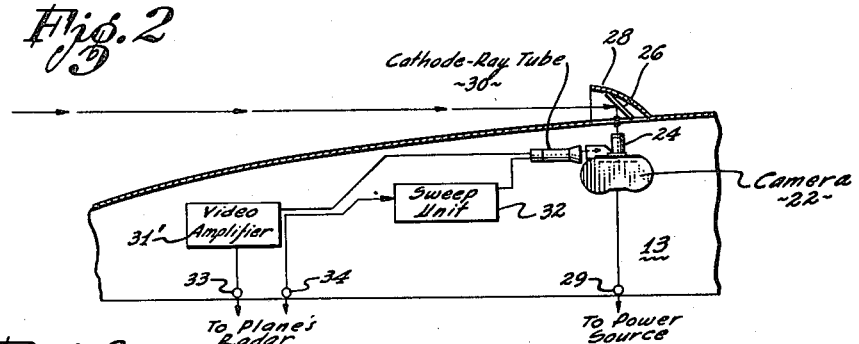
Figure 2 is a sectional view of the blister attached to the access panel of Figure 1, substantially on the line 2—2 of Figure 1, illustrating somewhat schematically various electronic and optical units which make up the apparatus used in the invention and which are mounted on the underside of the blister.

The jet fighter aircraft 10 of Figure 1 has a usual access panel 12. This panel is mounted on the top of the aircraft just forward of the cockpit. In accordance with one embodiment of the invention, and as shown in Figure 2, the various components of the apparatus of the invention are mounted on the underside of a blister 13 secured to this access panel. It should perhaps be reiterated that the blister may be mounted, if so desired, on any other convenient portion of the aircraft.

The apparatus of the embodiment of the invention shown in Figure 1 uses the main radar unit of the aircraft which is not shown and may be of any suitable known construction.

The components mounted in the blister 13 include a cathode-ray tube 30 which serves as the display unit for the system. The tube has a usual fluorescent viewing screen 31. A video amplifier 31' is also included, as is a sweep unit 32. The video amplifier and sweep unit supply control information to the tube 30, and these units have respective input terminals 33 and 34 which are connected to the ship's radar system in a manner well understood to those skilled in the radar art.

The apparatus of the invention also includes a motion picture camera 22. This camera may, for example, be of the usual 35 millimeter type, having a 4" lens and a film speed of 20 frames per second. The camera is equipped with a combining lens system 24 which will be described in detail. The camera is mounted on the underside of the blister 13 by any suitable mounting means (not shown), and it is positioned so that its lens 24 is directed upwardly towards a mirror element 26. The mirror element 26 is mounted in a cowl 28 formed in the blister 13. The mirror w6 is positioned to direct optical images of the field of view from the front of the aircraft to the lens 24. The camera is connected to a terminal 29 which is adapted to be connected to a suitable power source for driving the camera.

The physical characteristics and the electrical connections of the individual electrical components referred to above are well known. These components may be supported from the underside of the blister 13 by any suitable bracket means, as may be camera 22 and the cathode-ray tube 30. Also, the interconnecting wiring between these components may be secured to the blister in accordance with well known switchboard mounting techniques. The dimensions and configuration of the blister are such that it can be interchangeably mounted to substantially all present day jet fight aircraft. Thus, the blister supporting the components described above, constitutes a convenient package which enables the system of the invention to be installed in existing fighter aircraft quickly and with a minimum of labor and expense.

Figure 3:
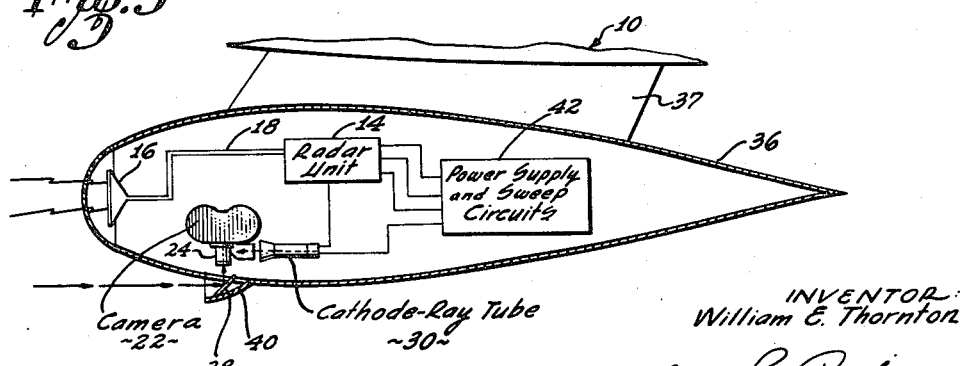
Figure 3 is a sectional view of a tank suitable to be carried from the bomb shackles of the aircraft, this figure illustrating in somewhat schematic form and in accordance with a second embodiment the mounting of the various components of the invention within this tank.

In the embodiment of Figure 3, the components of the system are mounted in a tank 36. The tank may be suspended from the bomb shackles of the aircraft, as previously mentioned.

In the second embodiment, a separate radar unit 14 is used, and an antenna 16 for the unit is mounted within the tank in a position to emit and receive signals through the front wall of the tank, this wall being permeable to radar waves. A waveguide 18 serves to couple the antenna 16 to the radar unit 14. The camera 22 is mounted so that its lens is directed effectively downwardly at a mirror element 38 mounted in a cowl 40 formed in the tank. The power supply and sweep circuits for the embodiment of Figure 3 are represented by a single unit 42. Both the radar unit and the camera of the latter embodiment are effectively directed forward along the path of the aircraft.

Figures 4 and 5 show the mechanical details of the camera 22, of the cathode-ray tube 30 and of the combining lens 24. Figures 4 and 5 also show a convenient means by which these elements may be supported in assembled relation with respect to one another and mounted on the blister housing 13 or in the tank 36. The camera 22 may be actuated by any suitable and conventional electric drive mechanism. The camera operates in known manner to draw a film strip 50 in an intermittent fashion from a reel 54 past a conventional shutter assembly 52 to a reel 56.

The lens system 24 includes a first section which constitutes a normal objective lens for the camera. This first section may includes, for example, a pair of convex lenses 57, 58. These lenses are mounted in a usual lens barrel 60, and they are axially spaced along the barrel. The lenses 57 and 58 are constructed to focus optical images onto the film strip 50 in successive image frames along the strip. A usual apertured stop 62 is positioned between the lenses 57, 58 in the lens barrel 60. The relative aperture of the first section of the lens system 24 may, for example, be f/8. The optical images introduced to the film strip of this system are represented, for example, by the image frame "A" in Figure 6.

The lens system 24 also includes a second section for directing images of the radar indications to the film strip. The radar indications appear as luminous spots on the screen 31 of the cathode-ray tube 30, and images of these spots are directed to the film strip in correlation with the optical image frames "A."

The second section of the lens system 24 is mounted in a housing 64. This housing is supported on the frame of the camera 22 by means of a bracket 66 (Figure 4). The entire assembly may be supported on the underside of the access panel 12 of Figure 2 (or in the tank 36 of Figure 3) in the described positions by means, for example, of a supporting arm 68. This arm is secured to the camera casing by means of screws 70. The housing 64 also serves to support the cathode-ray tube 30, and this is accomplished by means of a peripheral mounting collar 72. This collar surrounds the cathode ray tube adjacent its display screen 31 so that the display screen extends into the housing.

The second lens section includes a pair of convex lenses 74, 76 which are mounted in a lens barrel 78. The lens barrel 78, in turn, is supported within the housing 64 in any suitable manner. The two lens 74, 76 are spaced axially within the lens barrel 78 along an optical axis which is essentially perpendicular to the optical axis of the first section of the lens system 24. An apertured stop 80 is included in the lens barrel 78 between the lenses 74 and 76.

As clearly shown in Figures 4 and 5, the cathode-ray tube 30 is mounted on an axis essentially parallel to the optical axis of the first section of the lens system 24, and the tube is positioned with its screen 31 facing the rear of the camera 22. A mirror 82 is mounted within the housing 64. This mirror is positioned to direct images of the radar indications on the screen 31 of the cathode-ray tube 30 along the optical axis of the second section of the lens 24. These images are directed through the lenses 74, 76 and the aperture stop 78 into compartment 84. The compartment 84 is adjacent the lens barrel 60 of the first section of the lens system 24. A second mirror 86 is mounted in the compartment 84. This second mirror is positioned to direct the images from the lens 74 along a path parallel to the optical axis of the first lens section. The second section of the lens system 24 serves to focus on the film strip images of indications appearing on the screen 31 of the cathode-ray tube. The apertured stop 80 is adjusted so that the second lens section has a relative aperture of, for example, $f/0.5$. The second section produces transverse image frames such as the frame "B" of Figure 6. These latter image frames extend transversely across the film strip between successive ones of the optical image frames such as the frame "A." In this manner, the film strip carries a continuous record in successive optical image frames of the area to which the camera is directed, and the film strip also carries a correlated continuous record in successive transverse frames of the radar indications appearing on the screen 31 of the cathode-ray tube 30.

The embodiment of the invention which utilizes a separate radar unit is shown schematically on Figure 7. The radar unit 14, as mentioned above, is coupled to the antenna 16 through the wave guide section 18. The antenna 18 may be of the usual horn type. It is believed that the particular connections of a suitable radar unit, and the manner in which it is connected to its antenna, are sufficiently well understood so as to preclude the necessity here of a detailed description of the equipment. It is preferable that the radar unit be simple in its design, small in size and light in weight.

The cathode-ray tube 30 may be a usual 3" type, and it is connected to the sweep unit 32 and to the radar apparatus 14 in known manner. Each time the radar unit 14 causes an outgoing pulse to be radiated from the antenna 16, a corresponding luminous indication extending along the Y-axis appears at one side of the screen 31 of the cathode-ray tube 30. The sweep unit 32 initiates the sweep of the cathode-ray beam along the X-axis across the screen from this one side to the other. That is, the sweep unit 32 causes the beam to be swept linearly along the X-axis from one side of the screen to the other each time an outgoing pulse is radiated. The outgoing pulse is displayed at the starting edge of the screen as a luminous indication extending along the Y-axis (as noted above), and the echo pulses are displayed on the screen at respective positions along the X-axis corresponding to the respective ranges or distances of the objects producing these echo pulses. These echo pulses are each displayed as a luminous indication extending along the Y-axis of the screen. The above is in accordance with known radar practice.

The camera 22 is also energized by the power supply 34, and the camera is started concurrently with the radar apparatus when a projectile is fired towards a target by the aircraft in which the equipment is mounted.

The operation of the system may best be explained by reference to Figure 8. The camera 22 and the radar unit 14 are mounted, for example, in an attacking aircraft in the manner described above. A target, such as the target 100, may be of the usual airborne type, and it is towed by a towing aircraft using suitable towing equipment. As noted previously, it is merely necessary for the target 100 to be optically visible to the camera 22, and that it be radar reflective so as to be effectively "radar visible" to the radar unit 14.

When one or more projectiles, such as rockets, are fired by the attacking aircraft at the target 100, the range or distance between the air craft and the projectiles increases as the projectiles recede. At the same time, the distance between the attacking aircraft and the target decreases as the attacking aircraft closes with the target. As previously noted, the camera 22 and the radar unit 14 are turned on when the projectiles are fired by the attacking aircraft at the target. The camera 22 records optical images of the projectiles as they approach and pass the target. These optical images appear in successive optical image frames A1, A2, A3, on the film strip 50. At the same time the radar unit tracks the projectiles; and luminous indications of the ranges of the target, and also of each of the projectiles, are displayed on the screen 31 of the cathode-ray tube 30.

Images of the luminous indications appearing on the screen 31 are recorded on the film strip 50 in successive frames B1, B2, B3. These frames are interposed between the optical image frames and extend transversely across the film strip. The lens system 24 is constructed so that the X-axis of the cathode-ray tube screen 31 is represented in the frames B1, B2, B3 as extending transversely across the film strip, and the Y-axis of the screen is represented as extending longitudinally of the film strip.

Figure 9:
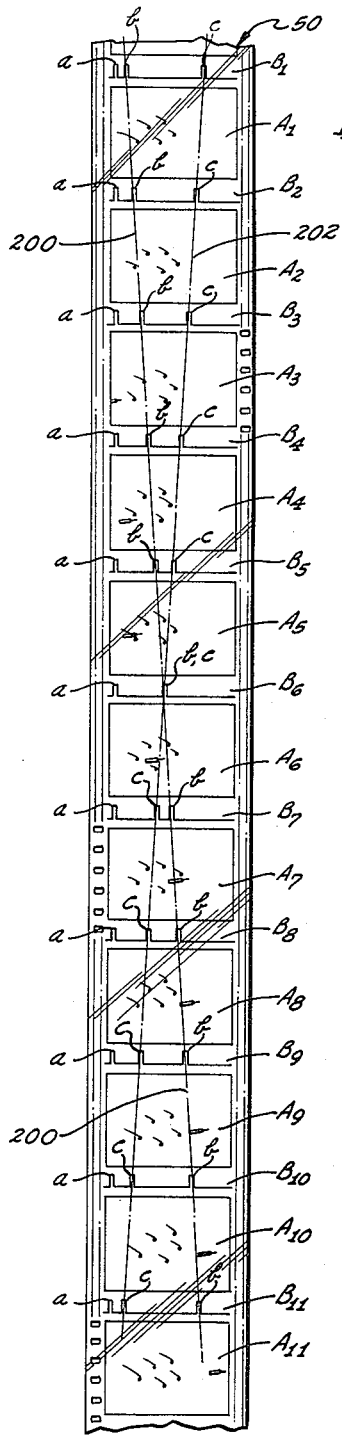
Figure 9 is a composite film strip bearing visual or optical information of the target area and also bearing radar indicated distance information concerning the target and projectiles fired at the target.

As best shown in Figure 9, successive ones of the optical image frames A1—A11 on the film strip 50 photograph the projectiles as they are fired by the attacking aircraft so that the camera effectively follows the projectiles as they approach and pass the target. Without the radar information, it is impossible to determine from the optical image frames alone which frame represents the projectiles as they actually cross the path of the target. However, by means of the radar images in the frames B1—B11, this particular frame can be determined.

In successive ones of the frames B1—B11 of the film strip of Figure 9, the images "b" represent the radar indications of one of the moving projectiles as they leave the attacking aircraft. When a salvo of projectiles is fired, it is evident that there will be a plurality of "b" images in each of the frames B1—B11. The images "b" become increasingly displaced along the X-axis from the images "a" of the outgoing pulse indications for successive ones of the frames B1—B11. That is, the images "b" effectively move from one of the frames B1—B11 to another along the film strip 50 in a path extending diagonally across the strip from its first side to its second side. This path is shown by the line 200, and it may be considered linear for all practical purposes when relatively short intervals are being considered.

Likewise, the images "c" in the frames B1—B11 represent the luminous radar indications corresponding to the target as it is moved across the photographed scene. The target indications proceed along the X-axis of the cathode-ray tube screen 31 towards the "a" indications in the opposite direction to the indications of the projectiles. This is because the target range is decreasing because the target is approached by the attacking aircraft, whereas the range of each projectile is increasing as they leave the aircraft. Therefore, the images "c" move effectively in a diagonal path from one frame to the next across the film and from its second side to its first side. As previously noted, this path may be considered linear for a short interval and may be represented by the line 202.

The point at which the diagonal path 200 of the images

"b" crosses the diagonal path 202 of the images "c" represents the optical image frame at which the target and projectile ranges or distances are equal. That is, this cross-over point represents the instant that the projectiles cross the path of the target. This occurs in frame A6, in the illustration of Figure 9.

As clearly shown in Figure 9, the images "b" and "c" proceed along their respective diagonal paths 200, 202 from frame to frame, and these images cross in the frame B6 corresponding to the optical image frame A6. The illustrated positioning of the radar indication frames B1—B11 with respect to the optical image frames A1—A11 enables the crossover point of the two paths 200, 202 to be found accurately even though some of the radar indications may be lost. That is, it is possible to interpolate or extrapolate the linear diagonal paths 200, 204 of the "b" and "c" images over relatively short distances without introducing noticeable errors. It is, therefore, possible to determine the crossover point, even though some of the corresponding radar indications do not appear on the screen 31 due to interference, or the like, and which results in the non-appearance of the images "b" and "c" in some of the frames B1—B11. This particular system is particularly useful when the aircraft's radar apparatus is used, and which apparatus might not be as sensitive for the purposes of the described system as a separate specially designed radar unit.

Figure 10:
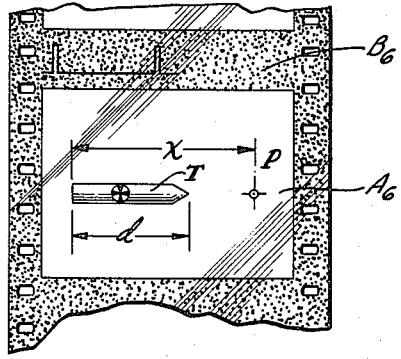
Figure 10 shows a selected frame from the film strip of Figure 9 illustrating how stadiametric measurements can be made from that frame.

As noted above, the optical image frame A6 (corresponding to the crossover point between the paths 200, 202 of the "b" and "c" radar images) is an actual photograph of the target area at the instant the projectiles cross the path of the target. This particular frame is shown on an enlarged scale in Figure 10. The frame A6 includes an image "T" of the target and a second image "P" of the projectile as it crosses the path of the target. Then, assuming that the actual size of the target is known, the miss distance between the target and the projectile can be calculated stadiametrically. That is, and with reference to Figure 10, where:

X: is the unknown miss distance in feet,
x: is the image size of the unknown miss distance, in inches,
D: is the true length of the target in feet,
d: is the image length of the target in inches,
Then: the actual miss distance:

$$X = \frac{xD}{d}$$

If the target size is unknown, but the range, the focal length of the first section of the lens 24, the angle of departure, and the magnification of the negatives are known, then the miss distance (X) can be calculated by the following equation:

$$X = \frac{xR}{Mf(\sin \theta)}$$

X: miss distance in feet
x: image size of the miss distance in inches
R: the range of the target and projectile at the crossover point in feet as determined by the radar indications,
f: the focal length of the first section of the lens 24 in inches,
θ: the angle of departure of the attack from 90° with respect to the traget,
M: magnification of the film.

It is also feasible to incorporate range fiducial indications on the screen of the cathode-ray tube. This can be done in accordance with known radar technique, by causing pulses to be fed to the system at precisely timed intervals. The resulting fiducial indications on the screen of the cathode-ray tube also appear on the film strip so that the actual ranges for any particular film frame can be readily determined. Thus, the miss distances can be readily determined by comparing the target-projectile displacements in the image frame with the known displacement between the fiducial images associated with that frame.

The invention provides, therefore, an improved and simplified instrumentality in which radar and optical principles are utilized for determining the characteristics of a body in flight, specifically, for determining the crossover point of a salvo of projectiles and an airborne target. It might be pointed out hat the system of the invention, unlike most prior art systems, is capable of precise and accurate operation in the tracking of a salvo of projectiles. That is, the system is not limited to use in situations where a single projectile is fired at a target, but it is capable of accurately providing desired data concerning each of a plurality of projectiles simultaneously fired at the target.

As described, the radar system tracks the salvo of rockets outbound in range and also tracks the target inbound in range, with representations of the rockets and of the targets being displayed as converging luminous spots on the screen of the cathode-ray tube associated with the radar system. Then the point at which these spots merge as one is the point at which rockets and targets are coincident in range.

The camera is linked with the cathode-ray tube presentation by the described modified lens arrangement, and the result is a series of composite pictures on a single film strip of the target area and of the cathode-ray tube presentation. This correlation of the radar information with the optical enables a particular optical image frame to be selected and used to determine the actual miss distances at the crossover points between the target and the rockets.

The apparatus of the invention is relatively light and compact. As described previously, it may conveniently be mounted in a blister secured to a convenient part of the aircraft, such as the access panel, or the apparatus may be mounted in a tank to be carried by the aircraft in the described manner. The apparatus is simple in its operation and requires no special instrumentation or undue expense in the target. Moreover, the apparatus and system of the invention operates with a high degree of reliability and accuracy. As described above, this accuracy is not impaired even in the presence of poor radar operating conditions, this latter feature being due to the fact that the radar indications are recorded on the film strip in a manner to enable simple interpolation or extrapolation to the crossover point to be made.

I claim:

1. A scorer system for indicating the miss-distance between a target and at least one projectile fired at the target from a firing point, said system including: motion picture camera means located at the firing point, means for mounting said camera means in a position at the firing point so that the camera means may be directed at the target to enable the camera means to record in successive film frames on a film strip drawn therethrough optical images showing the motions of the target and of the projectile as viewed from the firing point, radar means located at the firing point, antenna means coupled to the radar means and positioned to direct radar signals at the projectile and at the target and to receive echo signals from the projectile and from the target, means for utilizing such echo signals to provide an indication with respect to the firing point of the instant of range equality of the target and of the projectile, and means for transmitting said indication to said utilizing means to identify the optical image frame of the film strip which indicates the distance between the target and the projectile at the instant the projectile crosses the path of the target.

2. A scorer system for indicating the miss-distance between a target and at least one projectile fired at the target from a firing point, said system including: motion picture camera means located at the firing point, means for mounting said camera means in a position at the firing point so that the camera means may be directed at the target to enable the camera means to record in successive film frames on a film strip drawn therethrough optical images showing the motions of the target and of the projectile as viewed from the firing point, radar means located at the firing point, antenna means coupled to the radar means and positioned to direct radar signals at the projectile and at the target and to receive echo signals from the projectile and from the target, means including a cathode-ray tube for displaying images on a viewing screen thereof, means for causing the cathode-ray tube to display an image corresponding to the echo signals from the target and an image corresponding to the echo signals from the projectile continuously to indicate the range of the target and the projectile to determine with respect to the firing point the instant of range equality of the target and of the projectile, and means including a lens system for directing the target and projectile images displayed by the cathode-ray tube onto the film strip to be recorded thereon adjacent successive ones of the film frames thereby to identify the film frame which indicates the distance between the target and the projectile at the instant the projectile crosses the path of the target.

3. A scorer system for use on an aircraft for indicating the miss-distance between a target and at least one projectile fired at the target from the aircraft, said system including: motion picture camera means located on the aircraft, means for mounting said camera means in a position on the aircraft so that the camera may be directed at the target to enable the camera means to record in successive film frames on a film strip drawn therethrough optical images showing the motions of the target and of the projectile as viewed from the aircraft, radar means located on the aircraft, antenna means coupled to the radar means and positioned on the aircraft to direct radar signals at the projectile and at the target and to receive echo signals from the projectile and from the target, means including a cathode-ray tube for displaying images on a viewing screen thereof, means for causing the cathode-ray tube to display a target range-indicating image corresponding to the echo signals from the target and moving in one direction across the screen as the aircraft closes with the target and for causing the cathode ray tube to display a projectile range-indicating image corresponding to the echo signals from the projectile and moving in the opposite direction across the screen as the projectile moves away from the aircraft, said target image and said projectile image merging and crossing over at the instant of range equality with respect to the aircraft of the target and the projectile, and means including a lens system for directing the target image and the projectile image displayed by the cathode-ray tube onto the film strip to be recorded thereon adjacent successive ones of the film frames thereby to identify the film frame which indicates the distance between the target and the projectile at the instant the projectile crosses the path of the target.

4. A scorer system for use on an aircraft for indicating the miss-distance between a target and at least one projectile fired at the target from the aircraft, said system including: motion picture camera means located on the aircraft, means for mounting said camera means in a position on the aircraft so that the camera means may be directed at the target to enable the camera means to record in successive film frames on a film strip drawn through optical images showing the motions of the target and of the projectile as viewed from the aircraft, radar means located on the aircraft, antenna means coupled to the radar means and positioned on the aircraft to direct radar signals at the projectile and at the target and to receive echo signals from the projectile and from the target, means including a cathode-ray tube for displaying images on a viewing screen thereof, means for causing the cathode-ray tube to display a target range-indicating image corresponding to the echo signals from the target and moving in one direction across the screen as the aircraft closes with the target and for causing the cathode-ray tube to display a projectile range-indicating image corresponding to the echo signals from the projectile and moving in the opposite direction across the screen as the projectile moves away from the aircraft, said target image and said projectile image merging and crossing over at the instant of range equality with respect to the aircraft of the target and the projectile, and means including a lens system for directing the target image and projectile image displayed by the cathode-ray tube onto the film strip to be recorded in successive transverse frames on the film strip interposed between successive ones of the optical image frames so that the particular optical image film frame corresponding to the merged target image and projectile image indicates the distance between the target and the projectile at the instant the projectile crosses the path of the target.

5. The system defined in claim 4 in which said lens system is constructed to record the target and projectile images displayed on the screen of the cathode ray tube in successive ones of the transverse frames, with the target image in successive ones of the transverse frames progressing on a first diagonal path along the film strip and with the projectile image in successive ones of the transverse frames progressing in a second diagonal path along the film strip, the first and second diagonal paths crossing at the optical image frame representing the instant the projectile crosses the path of the target.

6. A method for determining the miss-distance between a target and at least one projectile fired at the target from a firing point, which method includes: recording at the firing point in successive film frames on a film strip optical images of the target and of the projectile as viewed from the firing point, directing radar signals at the target and at the projectile, receiving echo signals from the target and from the projectile in response to the reflections of the radar signals, utilizing such echo signals to determine with respect to the firing point the instant of range equality of the target and of the projectile and to provide a predetermined indication at said instant of range equality, and transmitting said indication to a utilization means to identify the optical image frame on the film strip which indicates the distance between the target and the projectile at the instant the projectile crosses the path of the target.

7. A method for determining the miss-distance between a target and at least one projectile fired at the target from a firing point, which method includes: recording at the firing point in successive film frames on a film strip optical images of the target and of the projectile as viewed from the firing point, directing radar signals at the target and at the projectile from the firing point for reflection of such signals from the target and from the projectile to the firing point, displaying a first image corresponding to the radar signals reflected from the target to the firing point and displaying a second image corresponding to the radar signals reflected from the projectile to the firing point to continuously indicate the range of the target and the projectile to determine with respect to the firing point the instant of range equality of the target and of the projectile, and directing the displayed images onto the film strip to be recorded thereon adjacent successive ones of the film frames so as to identify the film frame which indicates the distance between the target and the projectile at the instant the projectile crosses the path of the target.

8. Apparatus for indicating the distance between a target and a projectile fired at the target from a firing point, said system including: recording means for providing a record of the positions of the target and the projectile relative to the firing point at successive instants of time where such record is in a form adapted to produce a visual indication; means for mounting said recording means at the firing point; means at the firing point for providing signals at the successive instants of time in representation of the distances of the target and the projectile from the firing point; and means responsive to the signals from the signal means and coupled to the recording means for introducing the signals from the signal means to the recording means for the recording of such signals at the successive instants of time.

9. Apparatus for indicating the distance between a target and a projectile fired at the target from a firing point, said system including: recording means at the firing point for providing a record of the positions of the target and the projectile relative to the firing point at successive instants of time where such record is in a form adapted to produce a visual indication; means at the firing point for receiving and detecting, from the target and the projectile at the successive instants of time, signals representing the distances of the target and the projectile from the firing point; means responsive to the signals from the detecting means for converting such signals to indications capable of being recorded by the recording means; and means responsive to the indications from the converting means for introducing such signal indications to the recording means for the recording of such indications at the successive instants of time.

10. Apparatus for indicating the distance between a target and a projectile fired at the target from a firing point, said system including: recording means at the firing point for providing a record of the angular separation between the target and the projectile relative to the firing point where such record is in a form adapted to produce a visual indication; means for transmitting energy toward the projectile and the target and for receiving from the target and the projectile energies related to the transmitted energy and for detecting the energies received from the target and the projectile; means responsive to the energies detected by the last mentioned means for converting such detected energies to indications which are capable of being recorded by the recording means and which represent the distances between the firing point and the projectile and between the firing point and the target; and means coupled to the recording means and responsive to the indications from the converting means for introducing such indications to the recording means for the recording of such indications concurrently with the recording of the angular separation between the target and the projectile relative to the firing point.

11. A method of indicating the distance between a target and a projectile fired at the target from a firing point, including the steps of: providing a record of the angular separation between the target and the projectile relative to the firing point where the record is in a form adapted to produce a visual indication; receiving at the firing point first energy representing the distance of the target from the firing point and second energy representing the distance of the projectile from the firing point; respectively converting the first received energy and the second received energy to first and second indications capable of being recorded in a form similar to the record of the angular separation between the target and the projectile relative to the firing point; and recording the first and second indications concurrently with the recording of the angular separation between the target and the projectile relative to the firing point.

12. A method of indicating the distance between a target and a projectile fired at the target from a firing point, including the steps of: providing at successive instants of time a record of the positions of the target and the projectile relative to the firing point where the record is in a form adapted to produce a visual indication; receiving first energy from the target and second energy from the prejectile at times respectively representing the distances of the target and the projectile from the firing point; respectively converting the first received energy and the second received energy to first and second indications capable of being recorded in a form corresponding to the record of the positions of the target and the projectile relative to the firing point; and recording the first and second indications at the successive instants of time.

13. The method set forth in claim 12 in which energy is radiated from the firing point toward the target and the projectile and in which the first energy received from the target and the second energy received from the projectile are related to the radiated energy to provide an indication of the distance between the firing point and the target in accordance with the time between the radiated energy and the first received energy and to provide an indication of the distance between the firing point and the projectile in accordance with the time between the radiated energy and the second received energy.

References Cited in the file of this patent
UNITED STATES PATENTS

| | | |
|---|---|---|
| 2,705,319 | Dauber | Mar. 29, 1955 |
| 2,773,732 | Roberts et al. | Dec. 11, 1956 |

UNITED STATES PATENT OFFICE
CERTIFICATE OF CORRECTION

Patent No. 2,938,201　　　　　　　　　　　　　　　　May 24, 1960

William E. Thornton

It is hereby certified that error appears in the printed specification of the above numbered patent requiring correction and that the said Letters Patent should read as corrected below.

Column 9, line 29, after "camera" insert -- means --; column 12, line 22, for "prejectile" read -- projectile --.

Signed and sealed this 29th day of November 1960.

(SEAL)
Attest:
KARL H. AXLINE
Attesting Officer

ROBERT C. WATSON
Commissioner of Patents